(12) United States Patent
Furuta et al.

(10) Patent No.: US 6,556,403 B1
(45) Date of Patent: Apr. 29, 2003

(54) PROTECTIVE ELEMENT

(75) Inventors: Kazutaka Furuta, Kanuma (JP);
Norikazu Iwasaki, Kanuma (JP)

(73) Assignee: Sony Chemicals Corporation, Tokyo (JP)

( * ) Notice: Subject to any disclaimer, the term of this patent is extended or adjusted under 35 U.S.C. 154(b) by 0 days.

(21) Appl. No.: 09/612,518

(22) Filed: Jul. 6, 2000

(30) Foreign Application Priority Data

Jul. 29, 1999 (JP) ............................................ 11-215979

(51) Int. Cl.$^7$ ................................................ H02H 3/00
(52) U.S. Cl. ....................... 361/93.1; 361/103; 361/106
(58) Field of Search ............................ 361/6, 8, 13, 18, 361/93.1, 119, 103, 106, 38

(56) References Cited

U.S. PATENT DOCUMENTS 5,268,665 A * 12/1993 Iwao ........................ 338/22 R
5,805,393 A * 9/1998 Thomas ........................ 361/6

FOREIGN PATENT DOCUMENTS

| JP | A-8-236305 | 9/1996 |
| JP | A-10-98829 | 4/1998 |
| JP | A-10-261505 | 9/1998 |

* cited by examiner

*Primary Examiner*—Stephen W. Jackson
(74) *Attorney, Agent, or Firm*—Oliff & Berridge, PLC

(57) ABSTRACT

A protective element includes at least three electrodes provided on one PTC material. The PTC material operates as at least two PTC elements. This protective element can be manufactured, with fewer components, in an easy manner, and at lower cost, and can cope with overcurrent and overvoltage.

5 Claims, 5 Drawing Sheets

(x—x cross-sectional view)

20Y

PROTECTIVE ELEMENT

BACKGROUND OF THE INVENTION

1. Field of the Invention

The present invention relates to a protective element and a protective circuit for protecting a circuit to be protected from an overcurrent or an overvoltage by tripping of a PTC element.

2. Description of the Related Art

Conventionally, current fuses that are made of a low-melting-point metal, such as lead, tin or antimony, which are heated and melted off by overcurrents, are known as protective elements for interrupting overcurrents to circuits to be protected.

Moreover, PTC (Positive Temperature Coefficient) elements are known as devices, which are heated by overcurrents, whereby their resistance is increased, and the current flowing through the circuit to be protected is curbed.

Furthermore, protective devices have been proposed, in which a protective element is combined with a voltage sensing means, and the circuit to be protected is protected not only from overcurrent but also from overvoltages.

FIG. 6 is a circuit diagram of such a protective device, and FIG. 7A is a plane view and FIG. 7B is a cross-sectional view of the protective element 20X used in this circuit (see Japanese Patent Application Laid-Open No.8-236305). In the circuit in FIG. 6, the terminals A1 and A2 are connected to the electrode terminals of the device to be protected, such as a lithium-ion battery, and the terminals B1 and B2 are connected to the electrode terminals of a charging device or the like.

In this circuit, a PTC element 1 and a low-melting-point metal member 2 are connected in series between a first terminal a and a second terminal b, a heat-generating member 3 is connected between their connection point (electrode 5d) and a third terminal c, and the low-melting-point metal member 2 and the heat-generating member 3 are arranged in proximity to each other. Thus, the PTC element 1, the low-melting-point metal member 2 and the heat-generating member 3 constitute one protective element 20X.

In the protective element 20X, electrodes 5a, 5b, 5c and 5d are formed on a substrate 4, as shown in FIGS. 7A and 7B, the heat-generating member 3 is formed between the electrode 5c and the electrode 5d, the heat-generating member 3 is covered with an insulating layer 6, the PTC element 1 is formed on the electrode 5a, the low-melting-point metal member 2 is formed so as to bridge the PTC element 1, the electrode 5b and the electrode 5d on the substrate 4, and these are covered by a protective cap 7.

Moreover, this protective device is provided with a Zehner diode and a transistor as a voltage sensing means and a switching means.

With this protective device, when current is conducted to the heat-generating member 3 under regular operation, the PTC element 1 and the low-melting-point metal member 2 form a conduction line between the electrode terminals of the device to be protected, such as a lithium-ion battery, and the electrode terminals of the charging device or the like. However, when a reverse voltage that is larger than a predetermined breakdown voltage is applied to the Zehner diode, an abrupt base current $i_b$ flows, which causes a large collector current $i_c$ to flow through the heat-generating member 3 and heat the heat-generating member 3, the low-melting-point metal member 2 that is at a position near the heat-generating member 3 melts off, and the progression of an overcurrent in the device to be protected, such as a lithium-ion battery, which is connected to the terminals A1 and A2 can be prevented.

On the other hand, when an overcurrent exceeding a certain value flows through the terminals A1 and B1, first, the PTC element 1 curbs the current, then the low-melting-point metal member 2 melts off and interrupts the current.

FIG. 8 is a circuit diagram of still another protective device, and FIG. 9A is a front view and FIG. 9B is a side view of the protective element 20Y used in this circuit (see Japanese Patent Application Laid-open No. 10-98829). In this circuit, a first PTC element 1a and a second PTC element 1b are arranged on opposite sides of a stainless-steel plate 8 of the protective element 20Y. The first and the second PTC element 1a and 1b are elastically clamped by springs 9a and 9b, and assembled into a polymer protective casing 7. Moreover, as in the circuit in FIG. 6 above, a Zehner diode and a transistor are provided as a voltage sensing means and a switching means.

Consequently, with the protective circuit of FIG. 8, only the first PTC element 1a is conducted during regular operation, and during an overvoltage, current flows abruptly through the second PTC element 1b to heat the second PTC element, this heat is quickly conducted to the first PTC element, and the first PTC element trips, whereby the current into the circuit to be protected is curbed.

However, in a protective element using the above-described PTC element, to operate a PTC element 1 or 1a (FIGS. 6 and 8) that curbs the current in a conductive line in case of abnormal stances, a heat-generating member 3 (FIG. 6) or a second PTC element 1b (FIG. 8) have to be used separately.

Furthermore, to configure the protective elements 20X and 20Y using the PTC elements 1, 1a, and 1b or the heat-generating member 3, a substrate 4 or a casing 7 becomes necessary.

Therefore, there are the problems that the number of components for conventional protective elements is large and miniaturization is difficult, and manufacturing costs are high.

SUMMARY OF THE INVENTION

With regard to these problems of the prior art, it is an object of the present invention to provide a protective element that can be manufactured with fewer components, in an easy manner, and at lower cost, and can cope with overcurrent and overvoltage.

The inventors have discovered that when one PTC material is provided with three or more electrodes, the PTC material that is sandwiched by two of these operates as one separate PTC element, and thus the inventors perfected the protective element of the present invention. Moreover, they have discovered that when a circuit is configured such that two PTC elements are connected in parallel with a conduction line to a circuit to be protected, current flows through both PTC elements during regular operation, and current flows only through one of them during abnormality, then even if the current during the abnormality is comparatively smaller than during regular operation, it still trips the PTC element, and thus the protective circuit of the present invention was perfected.

In other words, the present invention provides a protective element which comprises one PTC material and at least three electrodes provided thereon, and the PTC material operates as at least two PTC elements.

Moreover, the present invention provides a protective circuit, comprising a first PTC element, a switching element and a second PTC element, wherein the first PTC element is connected in parallel with the switching element and the second PTC element connected in series; the switching element enables the conduction of current to the second PTC element under regular operation and interrupts the conduction of current to the second PTC element when a terminal voltage of the circuit to be protected is higher than a predetermined voltage; and the first PTC element trips due to the conducted current. Other objects and features of the present invention will be described or become apparent from the following disclosure.

DETAILED DESCRIPTION OF THE INVENTION

Figure 1A:
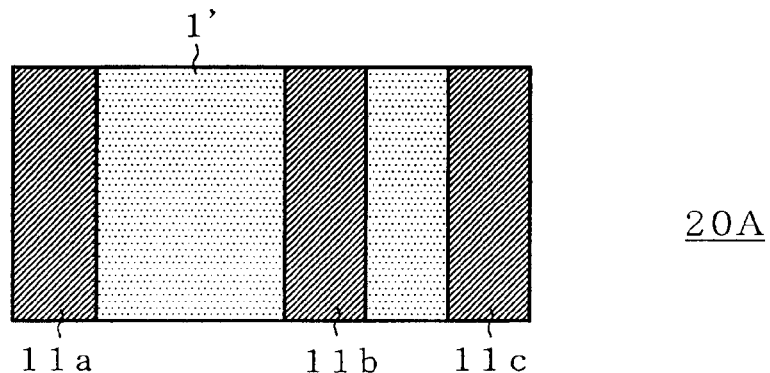
FIG. 1A is a plane view and FIG. 1B is a cross-sectional view of a protective element of the present invention.

The following is a detailed description of the present invention with reference to the drawings. It should be noted that in the drawings, equal numerals denote equal or equivalent structural elements.

Figure 1B:
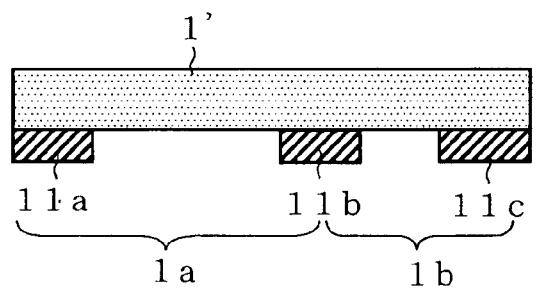

FIG. 1A is a plane view and FIG. 1B is a cross-sectional view of a protective element 20A of the present invention.

In this protective element 20A, a first electrode 11a, a second electrode 11b, and a third electrode 11c are provided in stripes on the surface of one side of a rectangular PTC material 1'. There is no particular limitation to the PTC material itself that can be used for the PTC material 1', and it is possible to use so-called polymer PTC in which conductive particles have been dispersed into a crystalline polymer (for example, a polyolefin-based resin), barium-titanate-based PTC, or christobalite-based PTC (see Japanese Patent Application Laid-Open No. 10-261505).

Moreover, there is not particular limitation to the materials and methods for forming the electrodes 11a, 11b, and 11c, and it is possible to form the electrodes 11a, 11b, and 11c by sputtering or the like.

This protective element 20A is made of one PTC material 1' as mentioned above, and although it can be manufactured easily, the first electrode 11a, the second electrode 11b and the PTC material 1' between them can be operated as a first PTC element 1a, and the second electrode 11b, the third electrode 11c and the PTC material 1' between them can be operated as a second PTC element 1b.

Moreover, the electrodes 11a, 11b and 11c are provided on the surface on one side of the PTC material 1', so this protective element 20A is suitable for surface-mounting.

Figure 2:
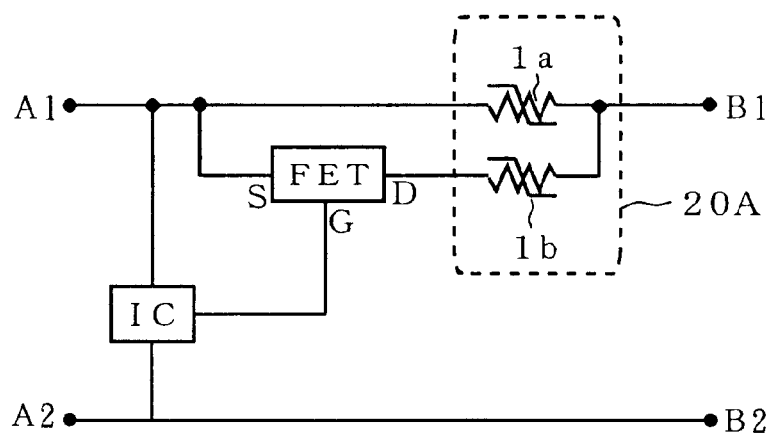
FIG. 2 is a circuit diagram showing a protective circuit of the present invention

FIG. 2 is a circuit diagram showing a protective circuit of the present invention, using the above-described protective element 20A. In this protective circuit, the terminals A1 and A2 are connected to the electrode terminals of a device to be protected, such as a lithium-ion battery, and the terminals B1 and B2 are connected to the electrode terminals of a charging device or the like.

Moreover, in this protective circuit, an FET is used as the switching element, source terminal S/drain terminal D of the FET and the second PTC element 1b are connected in series, and these are connected in parallel to the first PTC element 1a.

On the other hand, the gate terminal G of the FET is connected to an IC for detecting the terminal voltage of the circuit to be protected, and this IC controls the potential of the gate terminal G of the FET in accordance with the value of the detected terminal voltage of the circuit to be protected. In other words, if the IC does not sense any abnormality, that is, when the terminal voltage of the circuit to be protected is lower than a predetermined voltage, the IC turns the FET on, and the FET allows current to flow to the second PTC element 1b. Consequently, at this time, current flows through both the first PTC element 1a and the second PTC element 1b, in accordance with their resistance. When current flows through both PTC elements 1a and 1b in this manner and an overcurrent occurs, then the current is curbed due to tripping of the PTC elements 1a and 1b.

On the other hand, when the IC senses abnormality, that is, when it senses an overvoltage where the terminal voltage of the circuit to be protected exceeds a predetermined voltage, the IC turns the FET off, and the FET interrupts the current to the second PTC element 1b. As a result, when abnormality occurs, current flows only through the first PTC element 1a, and the first PTC element 1a trips quickly because of overcurrent.

With the protective circuit of the present invention, a device to be protected can be protected from overcurrent and overvoltage with an extremely simple configuration.

In the protective circuit of the present invention, the resistance for regular operation of the first PTC element 1a and the second PTC element 1b or the current value to cause tripping occurs can be chosen as appropriate, but it is preferable if the resistance of the first PTC element 1a is higher than the second PTC element 1b. In this case, the second PTC element 1b trips at large currents, and the first PTC element 1a trips also at relatively small currents, so that the first PTC element 1a can be caused to trip extremely quickly when the IC has detected an overvoltage.

It is also possible to realize the protective circuit in FIG. 2 by mounting two conventional PTC elements on a substrate, as long as the first PTC element 1a and the second PTC element 1b are connected in parallel as shown in the drawing, and it is not always necessary to use the protective elements 20A of the present invention.

Figure 3A:
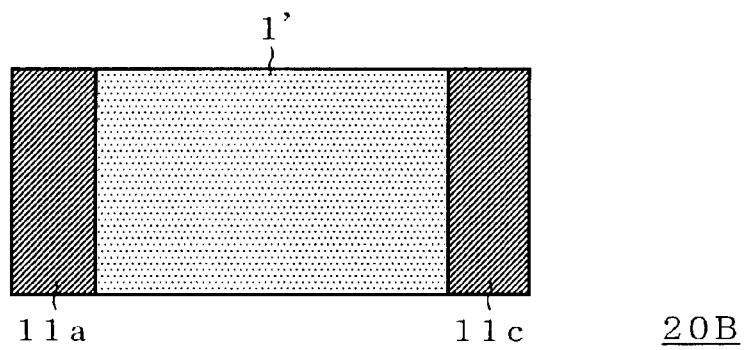
FIG. 3A is a plane view and FIG. 3B is a cross-sectional view of a protective element of the present invention.
Figure 3B:
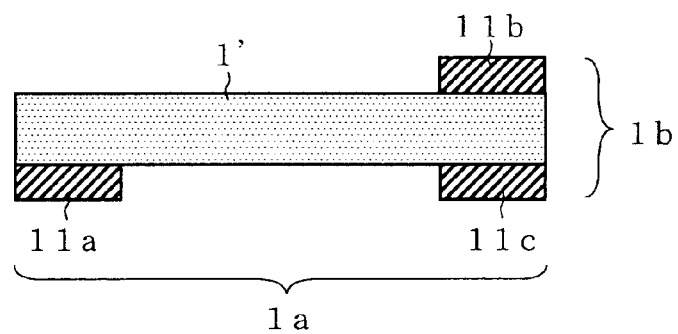

FIG. 3A is a plane view and FIG. 3B is a cross-sectional view of a protective element 20B in another embodiment of the present invention. In this protective element 20B, the second electrode 11b, which was provided substantially in the middle of the PTC material 1' in the protective element 20A in FIGS. 1A and 1B, is provided on the opposite side of the third electrode 11c. With this protective element 20B the first electrode 11a, the third electrode 11c and the PTC material 1' between them can be operated as a first PTC element 1a, and the second electrode 11b, the third electrode 11c and the PTC material 1' between them can be operated as a second PTC element 1b.

Figure 4A:
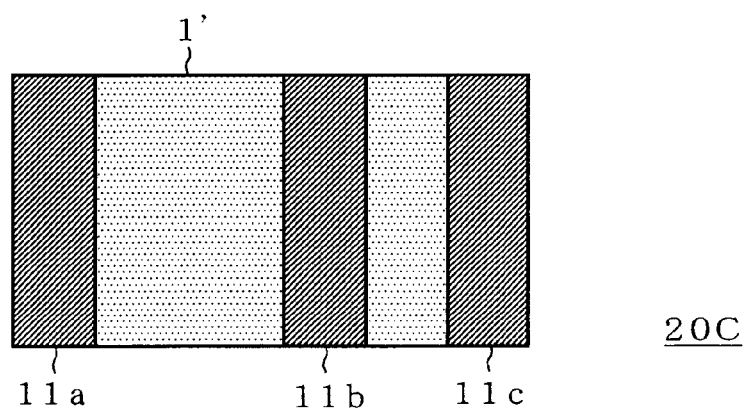
FIG. 4A is a plane view and FIG. 4B is a cross-sectional view of a protective element of the present invention.
Figure 4B:
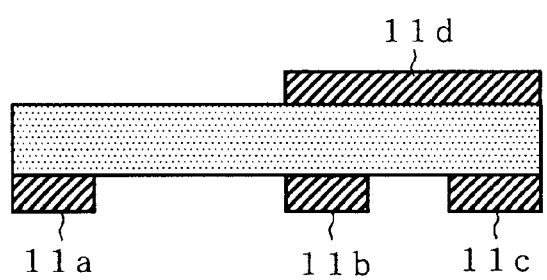

FIG. 4A is a plane view and FIG. 4B is a cross-sectional view of a protective element 20C in still another embodiment of the present invention. This protective element 20C is further provided with a fourth electrode 11d on the surface of the PTC material 1' on the side opposite the surface on which the electrodes are formed in the protected element 20A in FIGS. 1A and 1B. With this protective element 20C, the resistance between the electrode 11b and the electrode 11c can be made lower than in the protective element 20A in FIGS. 1A and 1B.

Figure 5A:
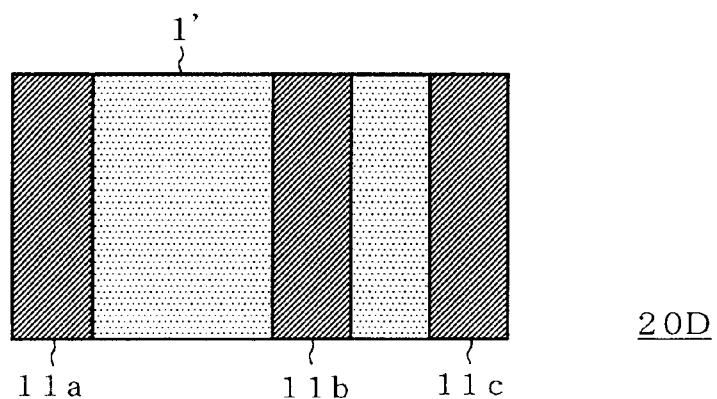
FIG. 5A is a plane view and FIG. 5B is a cross-sectional view of a protective element of the present invention.
Figure 5B:
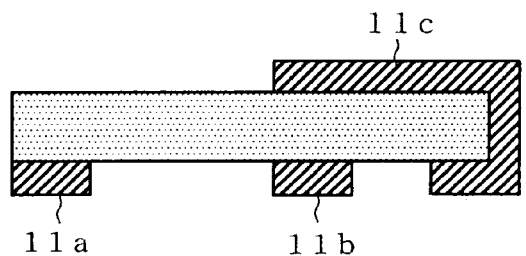
Figure 6:
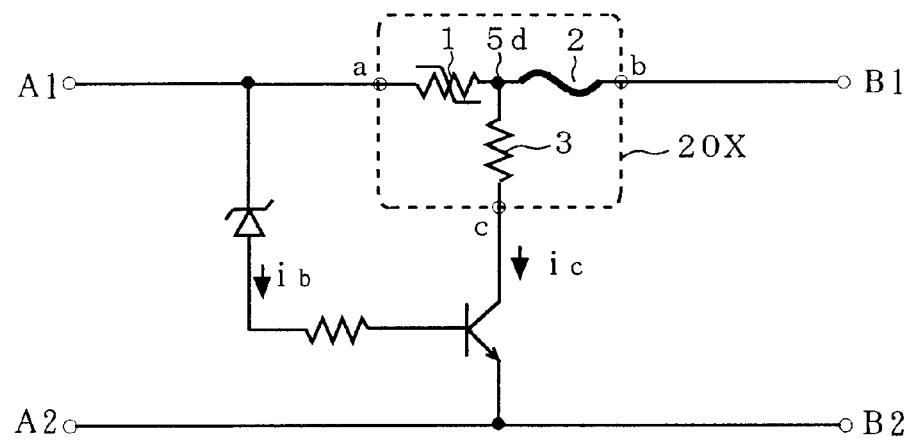
FIG. 6 is a circuit diagram of a conventional protective device.
Figure 7A:
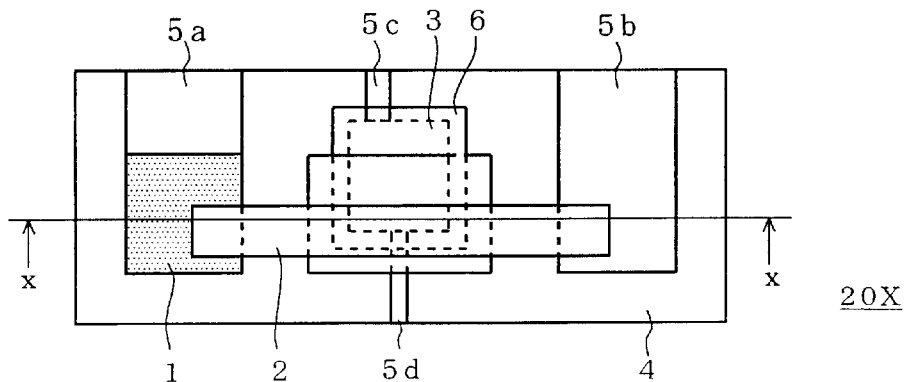
FIG. 7A is a plane view and FIG. 7B is a cross-sectional view of a conventional protective element.
Figure 7B:
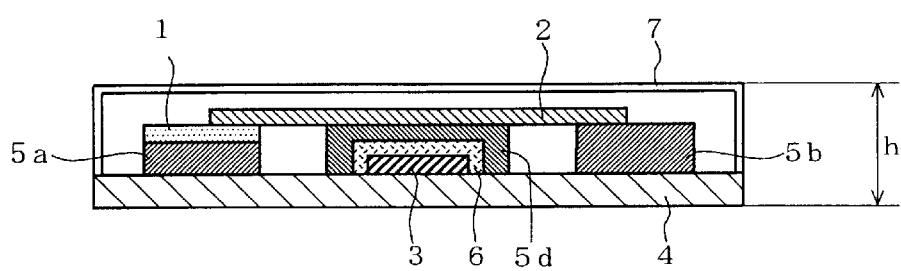
Figure 8:
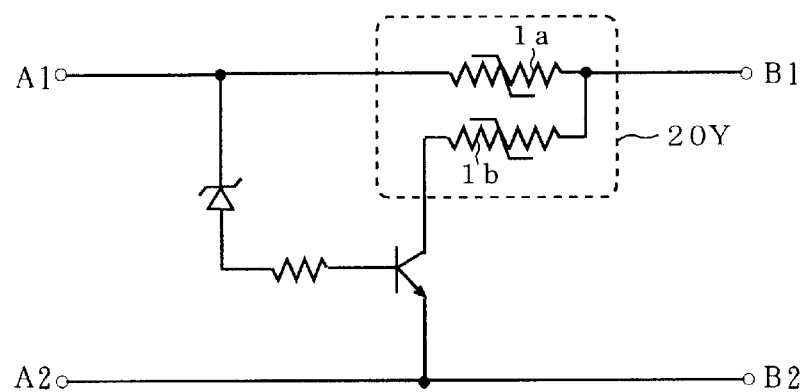
FIG. 8 is a circuit diagram of a conventional protective device.
Figure 9A:
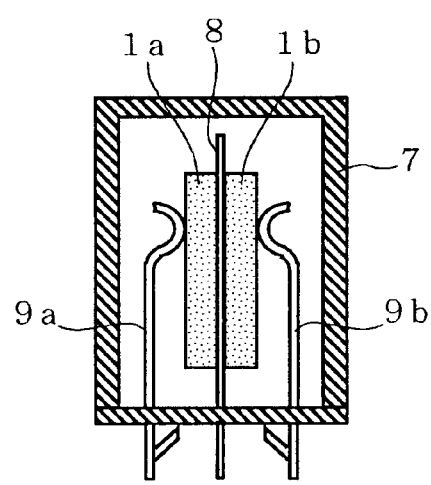
FIG. 9A is a front view and FIG. 9B is a side view of a conventional protective element.
Figure 9B:
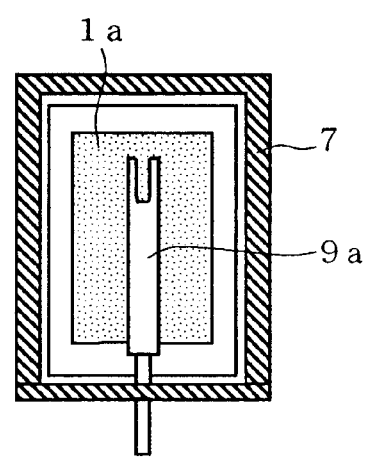

FIG. 5A is a plane view and FIG. 5B is a cross-sectional view of a protective element 20D in still another embodiment of the present invention. With this protective element 20D, the resistance between the electrode 11b and the electrode 11c can be made lower than in the protective element 20C in FIGS. 4A and 4B.

The protective element and the protective circuit of the present invention are not limited to the above-noted examples, and various embodiments are possible. The shape of the PTC material 1', the number of electrodes formed thereon, the shape of the electrodes, etc. can all be chosen as appropriate. For example, in the protective elements in the FIGS. 3A, 3B, 4A, 4B, 5A and 5B, at least two electrodes are provided on one surface of the PTC material, and a further electrode is provided on the other side of the PTC material, but for this case, how many electrodes are provided on which side of the PTC material can be chosen as appropriate.

Moreover, in the protective circuit of the present invention, it is also possible to use a bipolar transistor or a relay or the like instead of an FET for the switching element.

EXAMPLES

The present invention will be explained in more detail by referring to the following example.

Example 1

A protective element with the configuration shown in FIGS. 4A and 4B was made. For this example, a polymer PTC was used for the PTC material 1', and its size was 9 mm×3 mm×0.3 mm (thickness). The electrodes were formed by sputtering 3 mm×1.5 mm.

In the resulting PTC element 20C, the resistance between the first electrode 11a and the second electrode 11b (first PTC element 1a) was 300 mΩ and the resistance between the second electrode 11b and the third electrode 11c (second PTC element 1a) was 30 mΩ.

When current flows in parallel through the PTC element 1a and the PTC element 1b, the PTC element 1a and the PTC element 1b trip simultaneously at 5 A(ampere). On the other hand, when current flows only through the PTC element 1a, the PTC element 1a trips at 0.8 A(ampere).

With the present invention, a protective element having the functions of at least two PTC elements can be manufactured of one PTC material, easily and at low cost. Moreover, using the same, a circuit to be protected can be protected from overcurrent and overvoltage.

The entire disclosure of the specification, claims, drawings and summary of Japanese Patent Application No. 11-215979 filed Jul. 29, 1999 is hereby incorporated by the reference.

What is claimed is:

1. A protective circuit, comprising a protective element and a switching element, wherein said protective element comprises one PTC material and at least three electrodes provided therein, and the PTC material operating as at least a first PTC element and a second PTC element, wherein the first PTC element is connected in parallel with the switching element and the second PTC element connected in series; the switching element enables the conduction of current to the second PTC element under regular operation and interrupts the conduction of current to the second PTC element when a terminal voltage of the circuit to be protected is higher than a predetermined voltage; and the first PTC element trips due to the conducted current.

2. The protective element according to claim 1, wherein the first PTC element has a higher resistance than the second PTC element.

3. The protective element according to claim 1, wherein the switching element is an FET.

4. The protective element according to claim 2 wherein the switching element is an FET.

5. A protective element, comprising:

a single PTC material having a first end surface, a second end surface, a first side surface and a second side surface; and at least three electrodes provided on the first side surface, wherein at least one of the electrodes is also provided on at least the first end surface and at least a portion of the second side surface.

\* \* \* \* \*